July 9, 1968  R. L. LAWTER  3,391,700
ELECTRIC PROGRAMMING SYSTEM FOR VEHICLE WASHING APPARATUS
Filed Jan. 20, 1966  5 Sheets-Sheet 1
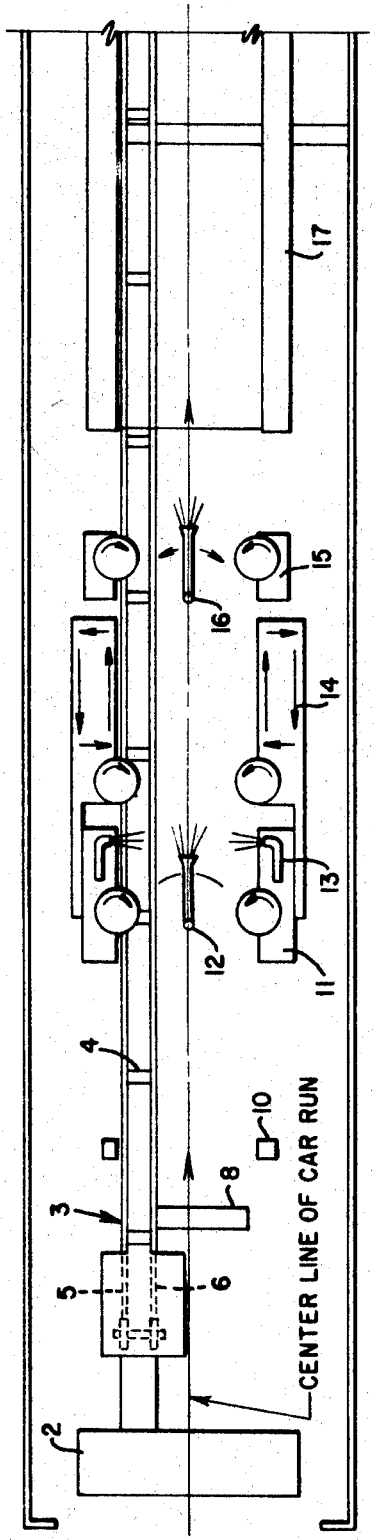
Fig. 1
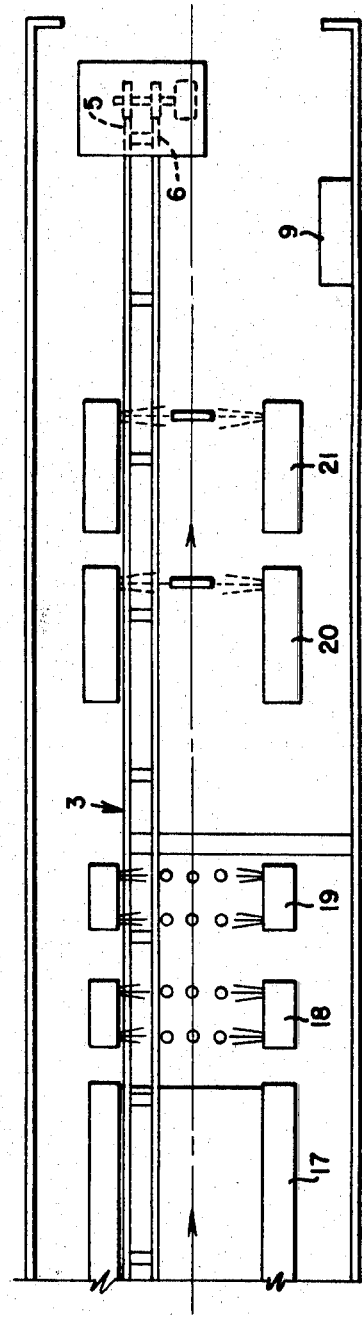
Fig. 1A
INVENTOR
RAYMOND L. LAWTER
BY
ATTORNEYS

INVENTOR.
RAYMOND L. LAWTER

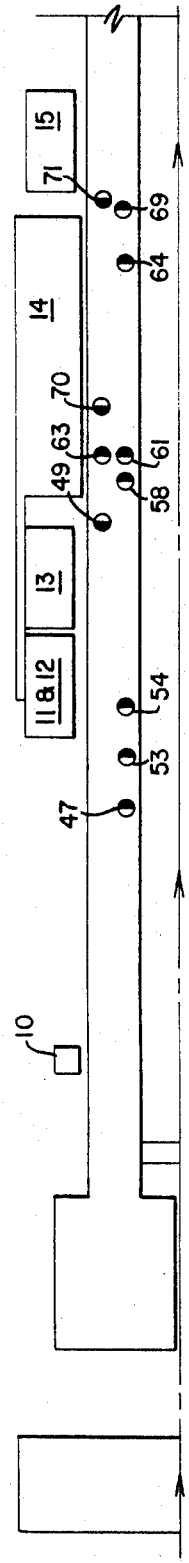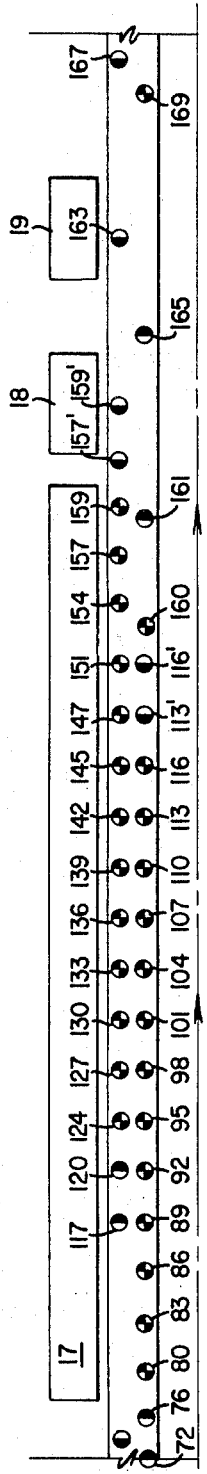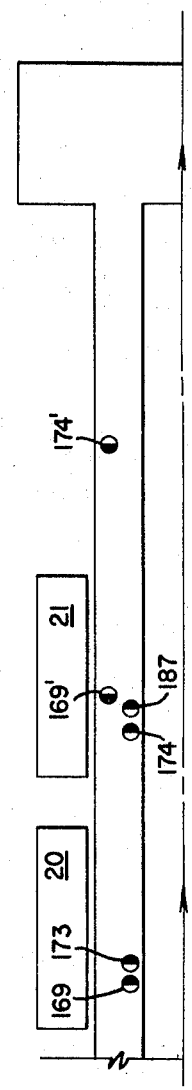

July 9, 1968  R. L. LAWTER  3,391,700
ELECTRIC PROGRAMMING SYSTEM FOR VEHICLE WASHING APPARATUS
Filed Jan. 20, 1966  5 Sheets-Sheet 5

INVENTOR.
RAYMOND L. LAWTER
ATTORNEYS

United States Patent Office 3,391,700
Patented July 9, 1968

3,391,700
ELECTRIC PROGRAMMING SYSTEM FOR
VEHICLE WASHING APPARATUS
Raymond L. Lawter, Zanesville, Ohio, assignor, by mesne assignments, to Dura Corporation, a wholly owned subsidiary of Walter Kidde & Company, Inc., Oak Park, Mich., a corporation of New York
Filed Jan. 20, 1966, Ser. No. 521,945
10 Claims. (Cl. 134—45)

The present invention relates to a vehicle washing system and more particularly to an automatic electrically controlled system for washing vehicles capable of programming the cycles of the various rinsing, washing and drying modules to the length of the vehicle being washed.

In the present vehicle washing systems substantially large volumes of water and detergents are employed to wash a single vehicle. Attempts have been made to control the flow of washing fluids either manually by operators visually observing the travel of the vehicle through the system or by suitably disposed feeler switches sequentially contacted by the vehicle during travel through the system. These systems were not completely automatic since they required attendant personnel to perform many of the switching functions.

It is an object of the present invention to produce an automatic vehicle washing system comprising a plurality of aligned operating modules, each of which is automatically programmed to be energized and deenergized for operation only when the vehicle is actually in position at the respective operating module.

Another object of the invention is the provision of an automatic vehicle washing system for serially washing vehicles of varying wheel base lengths whereby the system is programmed to energize and deenergize the various rinsing, washing and drying modules according to the length of the various vehicles.

Other objects and advantages of the invention will become apparent from reading the following detailed description of a preferred embodiment when considered in the light of the accompanying drawings in which:

FIGURE 1 is a top plan view of approximately the first half of a vehicle washing installation utilizing the present invention;

FIGURE 1A is a top plan view of the last half of the vehicle washing installation illustrated in FIGURE 1;

Figure 2:
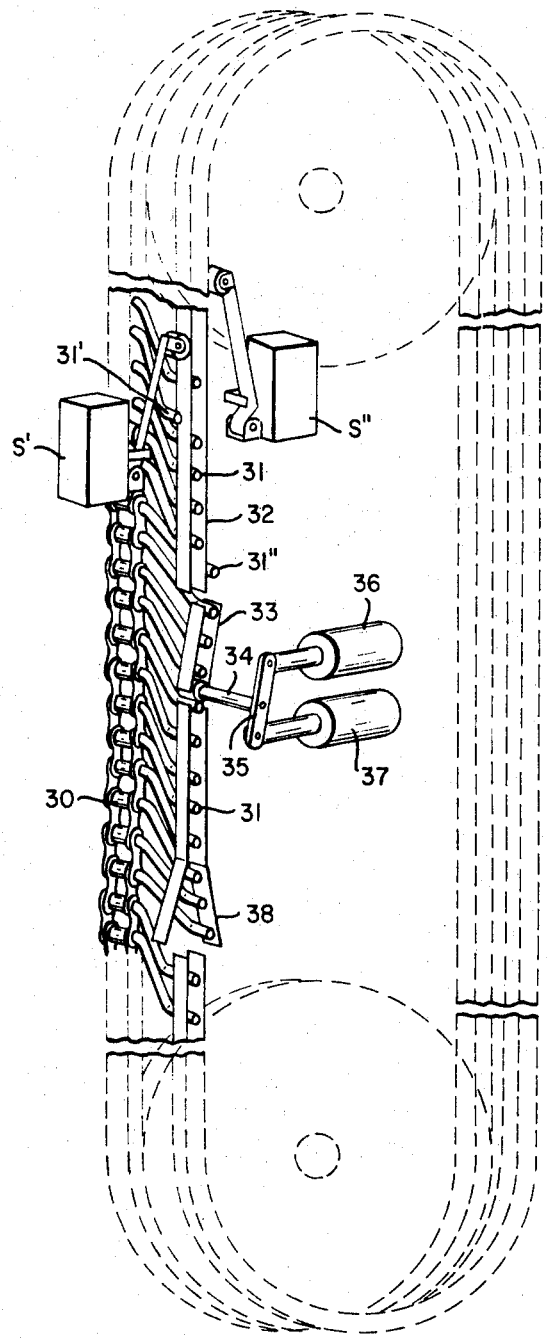
FIGURE 2 is a diagrammatic perspective view of memory control utilized for programming the various rinsing, washing and drying operations of the system illustrated in FIGURES 1 and 1A.

FIGURES 3, 3A, and 3B are schematic top plan views of successive portions of the switch locations in the memory control diagrammatically illustrating the location of the vehicle washing module; and FIGURES 4, 4A, 4B, and 4C are schematic illustrations of the complete electrical circuitry for operating the vehicle washing system illustrated in FIGURES 1 and 1A.

Referring to FIGURES 1 and 1A there is shown a vehicle washing system comprised of a plurality of operating modules through each of which the vehicle to be washed is moved by a conveyor 3 along a path substantially parallel to the axis of the vehicle at a uniform rate of speed.

The front wheel of the vehicle to be washed is positioned on an alignment station 2 which functions to properly align the vehicle so that the left front wheel thereof is in proper alignment with the conveyor 3. The conveyor 3 may be any suitable type of commercially available conveyor adapted to move a vehicle through the system along a path substantially parallel to the axis of the vehicle at a uniform rate of speed. One satisfactory type of conveyor is similar to that illustrated and described in United States Patent 3,058,433, issued Oct. 16, 1962. The conveyor 3 is typically recessed within the floor of the system and has a platform which is coplanar with the floor on which the wheels on one side of the vehicle will ride. The vehicle is moved along the platform by means of a plurality of rollers 4 spaced apart longitudinally of endless chain elements 5 and 6. The chains 5 and 6 are driven by a suitable motor 7 at a desired uniform rate to move the rollers 4, and the vehicle to be washed, along at such uniform rate of speed.

When the conveyor 3 is started, the roller 4 will contact the left front wheel of the vehicle and then advance the vehicle through the system. As the vehicle is moved forwardly, the right front wheel will initially contact a treadle 8 which sends an electrical signal to an electric programming control center 9, to be described in greater detail hereinafter, to control the operations of the various modules of the system.

The various modules of the system include an initial rinse module 10; first side brush and top swish 11, 12; side swish 13; wheel washer 14; second side brush and top swish 15, 16; rainbow room 17; final rinse 18; supplement rinse or wax applicator 19; low pressure dryer 20, and high pressure dryer 21.

The initial rinse module 10 is a prerinse in which the vehicle is sprayed with a detergent solution under low pressure.

The next module contains a pair of side brushes 11 which revolve about vertical axes and a top swish element 12. The side brushes 11 are caused to initially move in against the front portion of the vehicle being washed and are then guided to follow the side of the vehicle as it passes therebetween. The top swish element 12 sprays the washing fluid in a sweeping action under relatively high pressure across the top of the vehicle.

The vehicle is then caused to pass between the side swish elements 13 which deliver a relatively high pressure solution of water or suitable washing fluid through nozzles which oscillate about horizontal axes.

The wheels of the vehicle are washed by the wheel washer module 14 which includes a brush means adapted to move into engagement with the outwardly facing vertical side walls of the front tires and then move with the vehicle while brushing the tires. As soon as all of these surfaces of the front tires have been brushed, the wheel washing means 14 are energized to move out of engagement with the front wheels and return to their original starting position to await energization for the brushing of the rear tires in the same manner. The cycle of operation is illustrated diagrammatically by the arrows in FIGURE 1.

The second side brushes 15 and the top swish 16 function in the manner as the first side brushes 11 and the top swish 12.

The next module 17 is commonly referred to as a "rainbow room" which includes alternate arrays of nozzles in the floor, one array of which sprays forwardly and the other array of which sprays rearwardly to adequately remove dirt and contaminants which have collected on the undersurface of the vehicle. The module 17 also includes side oscillating spray nozzles and top spray nozzles.

The final rinse module 18 rinses the vehicle with clear water, while the module 19 may either be a supplemental rinse or alternatively may apply a liquid wax or the like.

Finally, the vehicle is caused to pass sequentially through a low pressure dryer module 20 and thence through a high pressure dryer module 21 to complete the drying operation.

The various modules are typically enclosed in a suitable building which is open at both ends to permit entrance and exit of the vehicles.

The modules of the system are sequentially controlled by an electric programming control circuit remotely situated in the programming center 9. The theory of operation involves the concept of energizing the various modules only when a vehicle is in position to be washed, rinsed, or dried thereby minimizing the power and supply requirements. In this regard, since the vehicles to be washed are of varying overall lengths the system must be capable of determining the length at the commencement of each respective washing cycle. In the system of the invention, the front tire of the vehicle being washed initiates energization of the control circuitry. It is known that the length from the front bumper to the point at which the front tire contacts the ground will vary from vehicle to vehicle. Therefore, the system must be set to commence all operations for the vehicles having the greatest length between the front bumper and the front tire.

When the vehicle to be washed enters the system, the alignment station 2 aligns the vehicle preparatory to being coupled to the roller 4 of the conveyor 3. Next the right front wheel of the vehicle depresses the treadle 8 which sends an electrical impulse to the programming center 9 which in turn functions to program the energization of the respective modules. Next, the rear wheel of the vehicle depresses the treadle 8 which sends an electrical impulse to the programming center 9 which in turn functions to program the de-energization of the respective modules. It will be appreciated that the various modules are only energized for a period determined by the particular length of the vehicle passing over the treadle 8 in the specific manner as will be understood from the following description with reference to the apparatus illustrated in FIGURE 2.

FIGURE 2 illustrates the electro-mechanical apparatus housed within the programming center 9. The apparatus is a self contained, electro-mechanical memory control which includes a continuous chain 30 which may be driven by a pair of spaced apart sprockets, one of which may be driven, while the other is an idler. The chain 30 is driven at a rate of speed synchronized with the speed of the conveyor 3. It will always move at a speed proportional to the conveyor speed. Each link of the chain 30 is provided with an outwardly extending pivotally mounted crank 31. The outer or free end of each crank 31 is disposed to ride in or be guided by a channel 32 which extends in a substantially continuous loop. Forming a continuous part of the channel 32 is a diverter section 33 which is mounted to pivot about a stub axle 34. The stub axle 34 has at its outer end a centrally mounted crank arm 35, the opposite ends of which are pivotally coupled respectively to the armatures of solenoids 36, 37.

As an example of the operation, the front wheel of the vehicle passes over the treadle 8 sending a first electrical impulse to the solenoid 36 causing the crank arm 35 to rock and simultaneously rock the stub axle 34 and the diverter section 33 effectively diverting the crank 31' to the outside of the channel 32. Then the diverter section 33 is returned to its normal position directing the cranks 31 to travel within the channel 32. As the rear wheel of the vehicle passes over the treadle 8, a second electrical impulse is sent to the solenoid 37 causing the crank arm 35 to rock and simultaneously pivot the diverter section 33 to the position illustrated in FIGURE 2 effectively diverting the crank 31" to the inside of the channel 32. Thereafter the diverter section 33 returns to its normal position directing the cranks 31 through the center of the channel 32.

The "reading" of the system illustrated in FIGURE 2 is accomplished by switches, whose positions from the recording point (the diverter section 33) are proportional to the distances of the various modules of the vehicle washing system of FIGURE 1 from the treadle 8.

There is diagrammatically illustrated in FIGURE 2 the type of switch elements employed in the system. These switches are designated as S' and S". The switch S' indicates the switches which will be operated by the front wheel actuated crank 31', while the switch S" indicates the switches which will be operated by the rear wheel actuated crank 31".

Accordingly, the cranks 31' and 31" continue their travel on one or the other side of the channel 32 toward the switches. Upon actuation, the switches cause the operation of respective ones of the various modules to either effect energization or deenergization thereof. Typically at the completion of a cycle, the cranks, which have been diverted to the outside or inside of the channel 32, will pass an erasing station 38 which returns the cranks to their neutral position within the channel 32.

FIGURES 3, 3A, and 3B diagrammatically show the positioning of the switches adjacent the channel 32 with respect to the module of the vehicle washing system to be operated.

FIGURES 4, 4A, 4B and 4C schematically illustrate the electrical circuit for energizing and deenergizing the various modules of the system of FIGURES 1 and 1A.

In the operation of the circuit of FIGURES 4, 4A, 4B and 4C, the electrically driven pumps and air compressor assembly for the modules are energized by suitable switching means and then the control circuit is suitably energized, in the following manner.

Initially, a master switch 40 (FIG. 4) is manually closed which in turn energizes the starter circuit for motor 41 and closes the normally open auxiliary contacts 42 and 43. The auxiliary contacts 42 are effective to lock in the motor 41 after switch 40 returns to an open position. The auxiliary contacts 43 are effective to energize the solenoid circuit between the power leads 44 and 45. In the operation of the system after an automotive vehicle has passed the entrance end, the front wheel thereof contacts the pressure sensitive treadle 8 which in turn actuates a solenoid 36 to dispose a crank element 31' in the front wheel channel of the programming apparatus illustrated in FIGURE 2. It will be appreciated that as the conveyor 3 moves the vehicle into the entrance end of the washing system, the rear tire will contact the pressure sensitive treadle 8 in a manner similar to the front tire and accordingly will actuate a solenoid 37 to place a crank element 31" of the programming apparatus in the rear wheel channel thereof. The crank 31' in the front wheel channel of the programming apparatus is moved forward by its power source and contacts a normally open switch 47 which when closed energizes a control relay 48 through a normally closed switch 49. Simultaneously, the control relay 48 will actuate the motors 50 which operate the two side brushes 11 and the top swish unit 12. When the control relay 48 is energized, a circuit is completed to solenoids 51 and 52 which are effective to cause the top swish unit 12 and the side brushes 11, respectively, to move toward and into contact with the associated vehicle. As will be appreciated from a study of the drawings, the first crank element 31' in the front wheel channel of the programming apparatus next contacts a switch 53 (FIG. 4C) which is a part of an "excess height" circuit, which will be explained in greater detail hereinafter.

The following occurrence, in the sequence of events, is the closing of a normally open switch 54 by the front wheel crank element 31' which energizes a control relay 55 which in turn actuates a motor 56 operatively connected to the side swish apparatus 13. Simultaneously a solenoid 57 is energized to cause the swing frame supporting the side swish 13 to move in and follow the contour of the transient vehicle. Next the front wheel crank member 31' contacts a normally open switch 58 and closes the same to actuate a control relay 59 which in turn energizes a motor 60 which is operatively coupled to the wheel washer assembly 14. The front wheel crank member 31' then contacts a normally open switch 61 which energizes a solenoid 62 to cause the wheel washer to move in against the respective wheels of the associated vehicle.

At approximately this point in the operation the rear wheel actuated crank 31" of the programming apparatus contacts the normally closed switch 49 and opens the same to deenergize the side brushes 11 and the top swish unit 12.

Next, the rear wheel actuated crank member of the programming apparatus contacts a normally open switch 63 which is effective through the solenoid 62 to cause the wheel washer 14 to again move into operative position against the rear wheels of the vehicle.

Meanwhile the front wheel crank element 31' closes a normally open switch 64 to thereby energize a control relay 65 which energizes motors 66 which are operatively connected to the second side brushes 15 and the top swish unit 16. Simultaneously, solenoids 67 and 68 are energized to cause the top swish unit 16 and the side brushes 15, respectively, to move into contact with the vehicle. It will be noted that the front crank member 31' next contacts a switch 69 (FIGS. 3 and 4C) which is an integral part of the "excess height" circuit which will be explained in greater detail hereinafter.

Thereafter, the rear wheel crank 31" opens a normally closed switch 70 which deenergizes motor 56 which drives the side swish 13. Then the rear tire crank member 31" opens a normally closed switch 71 to deenergize the wheel washer motor 60.

The front wheel crank 31' closes a switch 72 which energizes a control relay 73 through normally closed contacts of a control relay 74 to operate the first underside spray nozzles of the "rainbow room" module 17 by energizing a solenoid 75. Likewise, the front wheel crank element 31' closes a normally open switch 76 to energize a control relay 77 through normally closed contacts of a control relay 78 and simultaneously actuates the second under spray nozzle assembly of the module 17 through a solenoid 79. Then the front wheel crank member 31' closes a normally open switch 80 to energize control relay 74 through normally closed contacts of a control relay 81 which simultaneously actuates the third underside spray nozzle assembly of the module 17 through a solenoid 82 and opens the normally closed contacts of a control relay 74. The opening of the normally closed contacts of the control relay 74 deenergizes the control relay 73 and its associated solenoid 75 to stop the first underside spray nozzle assembly of the module 17. Next, the front wheel crank member 31' closes a normally opened switch 83 to energize the control relay 78 through a normally closed control relay 84 which energizes a solenoid to actuate a fourth underside spray nozzle assembly and simultaneously opens the normally closed control relay 78 to deenergize or deactivate the second underside spray nozzle assembly.

This sequential operation is then cyclically repeated through the normally open switches 86, 89, 92, 95, 98, 101, 104, 107, 110, 113, 113', 116, and 116' in the manner described with reference to the switches 72, 76, 80, and 83. It will be appreciated that at one single instance two of the underside spray nozzle assemblies will be in operation since, as the front wheel crank member 31' travels through its channel, it is continuously actuating one new underside spray nozzle assembly while simultaneously deenergizing another spray nozzle assembly three stages back.

At approximately the time the switch 86 is closed, the rear wheel crank member 31" opens the normally closed switch 64' to effectively deenergize the motors 66 which control the second side brushes 15 and the second top swish unit 16.

While the underside spray nozzle assembiles for spraying the front portion of the undersurface of the car have been energized and deenergized, a similar set of spray nozzle assemblies are sequentially energized and deenergized to spray the back portion of the undersurface of the car. More specifically, the rear wheel crank 31" closes a normally open switch 117 to energize a control relay 114 through the normally closed contacts of a control relay 118 to energize a solenoid 119 for controlling the first underside spray nozzle assembly. Following this operation, the rear wheel crank 31" closes a normally open switch 120 to energize a control relay 121 through a normally closed control relay 122 to energize an associated solenoid 123 to energize the second underside spray nozzle assemblies. Then, the rear wheel crank 31" closes a normally open switch 124 to energize the control relay 118 through a normally closed control relay 125 to simultaneously actuate a solenoid 126 to energize the third set of underside spray nozzle assemblies for the back portion of the vehicle and also opens the normally closed control relay 118 to deenergize the first set of underside spray nozzle assemblies through the solenoid 119. This sequence of operation continues through switches 127, 130, 133, 136, 139, 142, 145, 148, 151, 154, 157, 159, 157', and 159'; and then associated control relays 128, 131, 134, 137, 140, 143, 146, 149, 152, and 155; and solenoids 129, 132, 135, 138, 141, 144, 147, 150, 153, 156, and 158.

At approximately the time the switch 142 is actuated by the rear wheel crank 31", the front wheel crank 31' actuates a switch 160 which is a part of the "excess height" circuit which will be explained in greater detail hereinafter. Front wheel crank 31' now continues on to close a normally open switch 161 to energize a control relay 162 through a normally closed switch 163 to energize a solenoid 164 to operate the first final rinse module 18. Continuing with the description of the operation, the front wheel crank 31' now closes a normally open switch 165 to energize a control relay 166 through a normally closed switch 167 which controls a solenoid 168 of the supplemental rinse or wax applicator module 19. The next switch contacted by the front wheel crank 31' is a switch 169 which is a portion of the "excess height" circuit.

The rear wheel crank 31" now opens the normally closed switch 163 to deenergize the solenoid 164 and the associated final rinse module 18. Next, the rear wheel crank 31" opens the normally closed switch 167 to deenergize the solenoid 168 to inactivate the supplemental rinse or wax applicator module 19.

The front wheel crank 31' next closes the normally open switch 169 to energize a control relay 170 through a normally closed switch 169' to energize solenoids 171 and 172 which in turn actuate the top and side nozzles, respectively, of the first dryer module 20. The front crank 31' then closes a normally open switch 173 of the excess height" circuit. The front wheel crank 31' then closes a normally open switch 174 to energize a control relay 175 through a normally closed switch 174' which in turn energizes solenoids 176 and 177 to actuate the top and side nozzles, respectively, of the second dryer module 21. The front wheel crank 31' then closes a normally open switch 178 of the "excess height" circuit.

The rear wheel crank 31" then opens the normally closed switch 169' to deenergize the top and side nozzles of the first dryer module 20 through the control relay 170. Finally, the rear crank 31" opens the normally closed switch 174' to deenergize the control relay 175 which in turn deactivates or deenergizes the solenoids 176 and 177 to turn off the top and side nozzles of the second dryer module 21.

Figures 4, 4A:
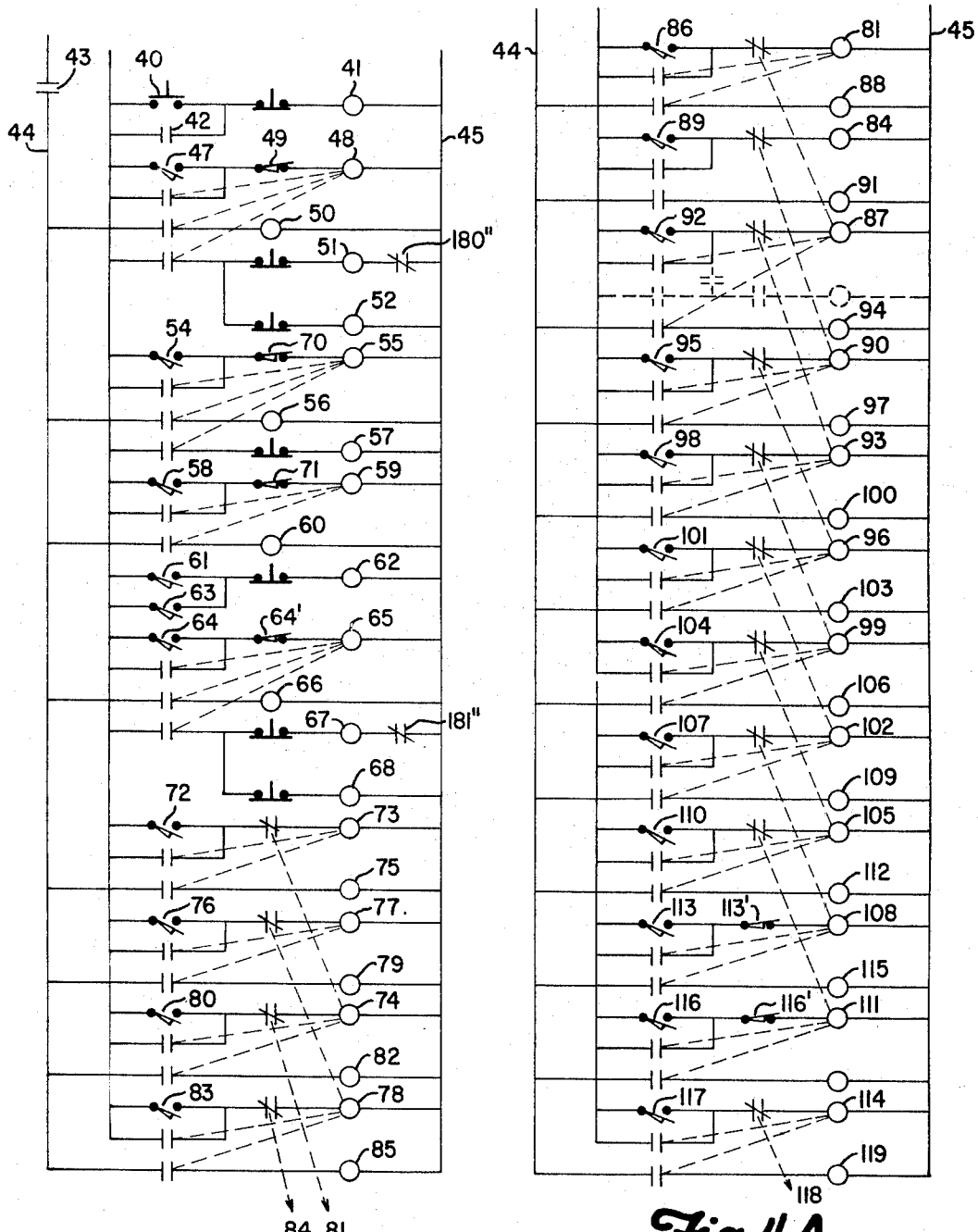
Figure 4B:
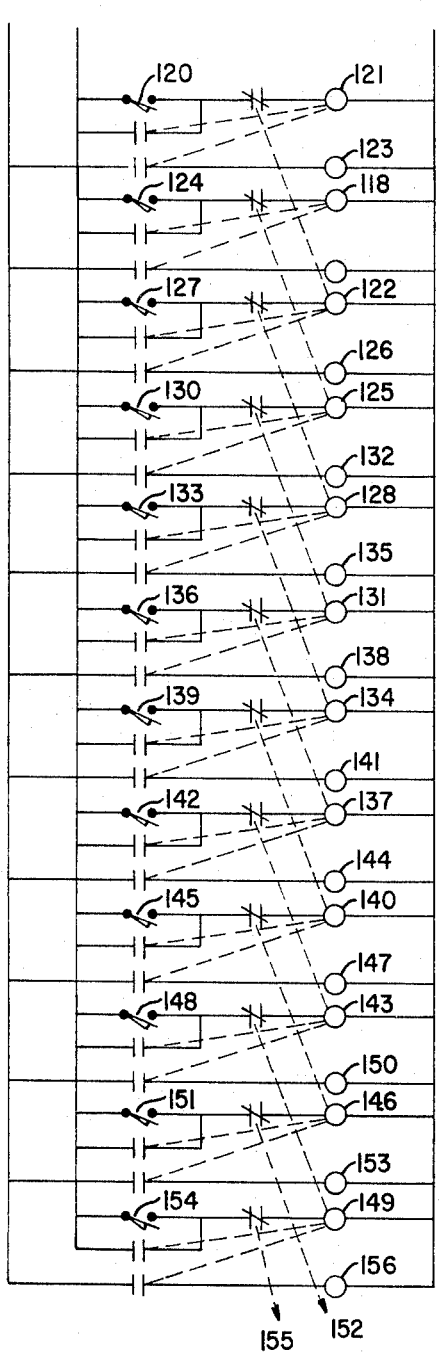
Figure 4C:
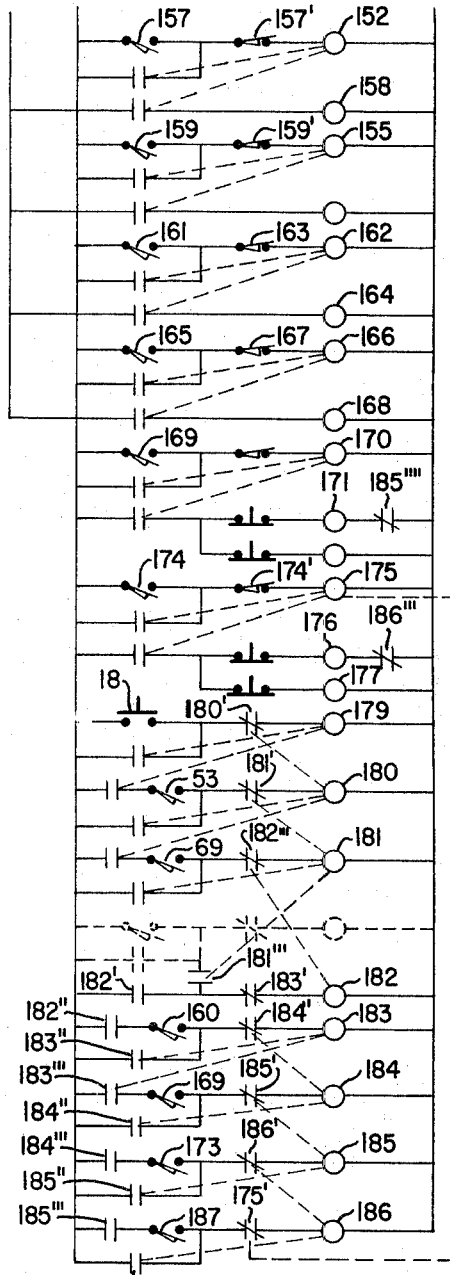

The above described circuitry is effective for satisfactorily washing and drying the exterior surface of the typical sedan-type vehicle wherein the top, sides and wheel surfaces are wetted and brushed to remove any dirt particles therefrom. However, when a convertible-type automotive vehicle is to be washed, it is necessary to energize the car washing system in such a way that the top brushes, swishes, or nozzles do not contact the fabric top portion of the vehicle which might cause damage thereto. In order to deactivate the top nozzles or brushes, a circuit previously referred to as "excess height" circuit has been incorporated as an integral part of this system. More specifically, to energize the excess height circuit, a manually operated normally open switch 18 (FIGS. 3A and 4C) is closed, thereby energizing a control relay 179 which closes the associated contact to prepare the circuit for energization. At this point the front wheel crank 31' will close a normally open switch 53 which will energize a control relay 180 to open two of the normally closed associated contacts 180' (FIG. 4C) and 180" (FIG. 4). Contacts 180' will remove the control relay 179 from the circuit; while the contacts 180" will deenergize solenoids 51 to stop or inactivate the first top swish 12.

Next, the front wheel crank 31' closes the normally open switch 69 to energize a control relay 181 which in turn opens its associated normally closed switch contacts 181' (FIG. 4C) and 181" (FIG. 4). The control relay contacts 181' effectively removes the control relay 180 from the circuit; while the control relay contacts 181" effectively deenergizes the solenoid 67 which in turn deenergizes the second top switch 16. The front wheel crank 31' now closes the normally open switch 92 which in turn has energized control relay 87 to energize a control relay 182 through the previously closed contact 181''' and a normally closed contact 183' of a control relay 183. Upon energization of the control relay 182, the normally closed contact 182''' will open, thereby deenergizing the control relay 181 and its associated contacts. Simultaneously, the control relay contacts 182" are closed thereby preparing the circuit containing the normally open switch 160 for operation.

The front wheel crank 31' then closes the normally open switch 160 to energize the control relay 183 through the normally closed contacts 184' of a control relay 184. The control relay 183 closes the normally open contacts 183" and 183'''. The latter of the control relay contacts, namely 183''', prepares the circuit containing the normally open switch 169 for operation. The front crank 31' now closes the normally open switch 169 to energize the control relay 184 through the normally closed contacts 185' of control relay 185. Upon energization of the control relay 184, the normally closed relay contacts 184' are opened dropping the control relay 183 from its circuit and simultaneously closing the associated control relay contacts 184" and 184'''. The latter control relay contacts 184''' prepare the circuit containing the switch 173 for operation. The front wheel crank 31' then closes the normally open switch 173 to energize the control relay 185 through the normally closed control relay contacts 186' of a control relay 186. The control relay 185 will open the control relay contact 185' and thereby remove the control relay 184 from the circuit, and simultaneously will close the control relay contacts 185" and 185''', the latter of which prepares the circuit containing the normally open switch 187 for operation. Also, the control relay 185 opens a normally closed control relay contact 185'''' to deenergize the solenoid 171 which will deenergize the top nozzle of the first dryer module 20. The front wheel crank 31' then closes the normally open switch 187 to energize the control relay 186 through the closed switch contact 175' to open the normally closed relay contact 186' removing the control relay 185 from the circuit, and simultaneously closing the contacts 186" and opening the normally closed contacts 186''', the latter of which deenergizes the top nozzle of the second dryer module 21. Finally, as the last rear tire crank completes the cycle, it effectively opens the normally closed switch 174' and deenergizes the control relay 175, opening the normally closed contacts 182', energizing the control relay 186, and completely deactivating the system.

It will be understood that the above description referred to only a single vehicle, while in practical operation the system would handle a number of vehicles sequentially. The front wheel of each vehicle would actuate the solenoid 36 through the treadle 8 to cause a crank member 31 to be diverted to travel along the outside of the channel 32 and the rear wheel would actuate the solenoid 37 through the treadle 8 to cause a crank member 31 to be diverted to travel along the inside of the channel 32. The movement of the diverted crank member will then each encounter in a sequential fashion the respective switch elements to sequentially energize and deenergize the various modules of the vehicle washing system. In all instances, after the crank members 31 have made a complete cycle, they are deflected from their operative or switch engaging positions to a neutral position to travel within the channel 32.

While a pair of solenoids 36 and 37 have been illustrated and described for actuating the diverter 33, other arrangements could be employed utilizing only a single solenoid which would, upon energization, initially divert a crank member 31 first to the outside of the channel 32 and then the subsequent energization thereof would divert a crank member to the inside of the channel 32.

While specific reference has been made in the foregoing description to the use of a vehicle wheel actuated treadle 8 it must be understood that the treadle could be replaced by a wand-like element protruding from the floor at the same location that the treadle occupied. By employing such an input sensor element, the programming cycles of the system could be based on the actual distance between the front and rear bumpers of the vehicles being washed.

Although the memory control device illustrated and described herein has been found to perform satisfactorily, other memory devices could be employed to achieve the desired objectives.

According to the patent statutes, I have explained the principles and mode of operation of my invention, and have illustrated and described what I now consider to represent its best embodiment. However, I desire to have it understood that, within the scope of the appended claims, the invention may be practiced otherwise than as specifically illustrated and described.

What I claim is:

1. A system for washing vehicles having an entrance and an exit, a plurality of washing, rinsing, and drying modules spaced between the entrance and the exit, and a vehicle conveyor means for conveying vehicles sequentially along a path from the entrance to the exit including:

electrically actuated means for selectively energizing respective ones of the modules;

a memory control device upon which a series of sequentially arranged bits of information may be stored;

means sensing the substantial overall length of a vehicle for impressing bits of information corresponding to the vehicle length on said memory control device;

read out means for sensing the bits of information stored by said memory control device, said read out means and said memory control device being movable relative to one another; and means coupling said read out means to said electrically actuated means to thereby selectively energize respective ones of the washing, rinsing, and drying modules.

2. A system as defined in claim 1 wherein said memory control device comprises a continuous chain having a plurality of memory elements incorporated therein.

3. A system as defined in claim 2 wherein said memory elements are carried by said chain and are displaceable therefrom.

4. A system as defined in claim 3 including means for moving said chain at a speed synchronized with the speed of the conveyor means.

5. A system as defined in claim 4 wherein said means sensing the substantial overall length of a vehicle for impressing bit of information corresponding to the vehicle length on said memory control device includes means for displacing selective ones of said memory elements.

6. A system as defined in claim 5 wherein said read out means includes a plurality of electrical contact elements disposed along said chain and actuatable by displaced memory elements of said chain.

7. A system as defined in claim 6 wherein said means sensing the substantial overall length of a vehicle includes vehicle wheel actuated treadle means at the entrance of the system.

8. A system as defined in claim 7 wherein said modules include outlet nozzles directed toward the path.

9. A system as defined in claim 8 wherein said electrically actuated means for selectively energizing respective ones of said modules includes means for opening and closing said outlet nozzles.

10. A system as defined in claim 9 wherein said means for displacing selective memory elements includes at least one solenoid.

References Cited

UNITED STATES PATENTS

| | | | |
|---|---|---|---|
| 1,791,216 | 2/1931 | Leschke | 134—45 |
| 3,024,795 | 3/1962 | Roller et al. | 134—123 XR |
| 3,259,138 | 7/1966 | Heinicke | 134—45 |

ROBERT L. BLEUTGE, *Primary Examiner.*